3,053,765
VISCOUS WATER WATERFLOODING
William J. Sparks, Westfield, N.J., assignor to Jersey Production Research Company, a corporation of Delaware
No Drawing. Filed May 1, 1959, Ser. No. 810,267
9 Claims. (Cl. 252—8.55)

The present invention is broadly concerned with the recovery of petroleum from underground reservoirs. More particularly, it concerns a method of waterflooding in which the viscosity of the flood water is increased by the addition of a polysaccharide derived from sucrose by enzymatic reaction together with one or more water-dispersible materials of a character to stabilize the viscosity of the resulting aqueous mixture. The invention is especially concerned with a waterflooding process in which the flood water is a viscous aqueous solution of dextran containing a bactericide such as formaldehyde in an amount to reduce the tendency of the solution to degrade viscosity-wise.

It is a well-known practice in the petroleum industry to waterflood subterranean petroleum reservoirs in order to increase the recovery of petroleum therefrom. Thus, it is a common practice to inject water into such reservoirs through one or more injection wells so as to displace and recover oil from the reservoirs through one or more production wells spaced from the injection wells.

While conventional waterflooding is effective in obtaining additional oil from underground reservoirs, it has a number of shortcomings which detract from its value. Among these is the tendency of flood water to finger through a reservoir and to by-pass substantial portions thereof. In other words, a waterflood or water drive usually has a less than perfect "sweep" efficiency in that the water does not contact all portions of the reservoir. Furthermore, much of the recoverable oil is not normally displaced even from those portions of a reservoir that are actually contacted by the flood water.

The fingering tendency of a waterflood is usually explained by the fact that oil reservoirs possess regions or strata that have different permeabilities. Some of these regions and strata have a greater relative permeability to water than do other portions of the reservoir, with the result that flood water flows more readily through these regions and strata. This causes an inefficient displacement of the oil by the water.

Petroleum crude oils vary greatly in viscosity—some being as low as one or two centipoises (cp.) and some ranging up to 1000 centipoises or even more. This information is of interest, since waterflooding is generally less satisfactory with viscous crude oils than with relatively non-viscous oils. In other words, the fingering and by-passing tendencies of flood water are inversely related to the ratio of the viscosity of the flood water within a reservoir to the viscosity of the crude oil. In fact, this mathematical relationship has proven helpful in explaining the behavior of fluids flowing through porous media such as petroleum reservoirs. The relationship shows that oil is displaced more efficiently by water when the water-to-oil viscosity ratio is increased.

The water-to-oil viscosity ratio existing within a given reservoir affords a measure of the volume of flood water required in waterflooding the reservoir to reduce its oil content to a particular value. Thus, a given volume of flood water operating at a water-to-oil viscosity ratio of one will displace a markedly greater volume of oil from a reservoir than will an equal volume of water operating at a water-to-oil viscosity ratio substantially less than one.

The significance or importance of the water-to-oil viscosity ratio in waterflooding operations has led a number of persons to use or suggest the use of water-soluble polymers, chemicals, and other thickener materials to increase the viscosity of flood water. These techniques, however, have met with varied—and usually limited—success. For the most part, they have the disadvantage of requiring large amounts of expensive materials. Furthermore, many of the solutions tend to plug earth formations; and they are often degraded to an undesirable extent by temperature, light, and by the presence of materials naturally occurring within reservoirs. For example, reservoir sands and the ions present in most reservoir connate waters frequently have a very adverse effect upon the stability of such solutions. Also, the thickener materials are often adsorbed by reservoir rock surfaces and are thereby removed from solution.

It is, accordingly, a general object of this invention to provide means for increasing the viscosity of flood water used in waterflooding operations by the addition thereto, or the formation therein, of a thickening agent which overcomes the difficulties associated with the thickening agents that have been previously used or suggested for use in such operations. It is a further object of the invention to provide a waterflooding process using water of increased viscosity wherein the viscosity of the water has increased stability within petroleum reservoirs. It is still a further object of the invention to provide a method of increasing the viscosity of flood water by incorporating materials within the water which render the water viscous; which do not degrade within reservoirs; and which are economical, readily available, and do not tend to plug reservoirs.

These and related objects of the invention, which will be expressly discussed or readily apparent from the following description, may be attained by using flood water containing a polysaccharide derived from sucrose by enzymatic reaction and in an amount sufficient to increase the viscosity of the water. The flood water must also contain a small but sufficient amount of a preservative of a character to prevent the growth of microorganisms which would otherwise tend to destroy the polysaccharide. Both the polysaccharide and the preservative are added to, or formed within, the flood water before it is injected within a reservoir. Conventional techniques may be used for actually injecting the water through one or more input wells into a reservoir and for recovering petroleum thus displaced from the reservoir through one or more output wells spaced from the input wells.

In incorporating a polysaccharide thickener of the invention to a flood water, the desired concentration of thickener may be obtained simply by dissolving a commercially available material of this type within the water. Alternatively, the thickener may be grown or manufactured directly at the reservoir site through the use of suitable nutrient aqueous sucrose solutions together with suitable microorganisms. In either case, a preservative is added to the water when the desired viscosity for the water has been attained. The water is then ready for use.

In practicing this invention, the use of many conventional polysaccharide thickeners and preservatives will occur to persons skilled in the art. However, the best mode contemplated for carrying out the invention comprises incorporating sufficient dextran within a flood water to obtain a preselected viscosity for the water, and also incorporating a sufficient amount of formaldehyde within the water to prevent degradation of the dextran. Dextran has been found to be thermally stable over a wide range of reservoir temperatures, and it has a substantial thickening effect on water. It is neither adsorbed nor degraded by contact with rock surfaces; and the ions present within most reservoirs have little effect upon it. It is also substantially non-plugging. Formaldehyde, on the other hand, has been found to have not only a pronounced bactericidal effect within dextran solutions, but also a pronounced stabilizing chemical effect. In other words, formaldehyde not only protects a dextran solution against the effects of microorganisms such as bacteria and molds; it also greatly improves the chemical stability of the dextran at reservoir temperatures and in the presence of rock surfaces, ions, etc.

As is well known in the art, dextran is conventionally derived from aqueous sucrose solutions by the action of microorganisms such as leuconostoc mesenteriodes. Once formed, the dextran may be precipitated from the resulting solution as by the addition of alcohol; and the precipitated dextran then filtered or otherwise separated from the solution.

In the practice of the invention, it is contemplated that dextran manufactured and separated in the manner described above may be added to a flood water in the amount required to obtain the desired viscosity. The best mode of practicing the invention, however, is contemplated to comprise generating the dextran by enzymatic reaction directly within a portion of the flood water to form a thickened solution directly at the reservoir site. It is further contemplated that dextran may be grown in a portion of the flood water and that this portion may then be blended with the main body of flood water preparatory to its injection within a reservoir.

The amount of dextran to be added to a flood water in any given reservoir may vary considerably. In general, of course, the amount of dextran should be such as to increase the flood water's ability to displace oil from the reservoir. Preferably, the quantity of dextran should be sufficient to endow the flood water with a mobility within the reservoir which is equal to or less than the mobility of the reservoir oil. As a practical matter, the method of this invention has application particularly to those reservoirs in which the oil has a viscosity of at least about five cp. When practicing the invention in such reservoirs, then, the dextran-thickened water would normally have a viscosity of at least about five cp.—and preferably at least enough to provide the flood water with a mobility about equal to that of the reservoir oil.

In incorporating dextran within a body of flood water, it may be incorporated within the entire body of water; or, alternatively, it may be incorporated merely within the forward or leading portion of the flood. When limiting the presence of dextran to the leading portion of the flood, however, the volume of water thickened by the dextran should preferably be sufficient to prevent the trailing, relatively non-viscous water from breaking through the viscous water and contacting reservoir oil ahead of the viscous water.

The minimum quantity of viscous water to be used in any given reservoir will depend upon such well-recognized factors as the flooding pattern, the distance between wells, the viscosity of the crude oil, etc. In general, however, it is contemplated that the volume of viscous water should be at least 10 percent of the reservoir pore volume under flood, and preferably at least 20 percent of the pore volume.

It is well to note at this point that it is conventional in the petroleum industry to carry out waterflooding operations using certain regular flooding patterns. Thus, the volume of a reservoir under flood at any one time may be considered to be the volume of the reservoir underlying the lateral area defined by the patterns under flood at such time. Expressed otherwise, it is general practice in the petroleum industry—especially in large reservoirs or fields—to flood using one or more flooding patterns. It may therefore be convenient, in applying a bank-type version of the present invention, to consider the individual patterns within a reservoir in determining the quantities of viscous water to employ. To illustrate, in line-drive floods, it may be assumed that the pore volume of a reservoir under flood between each row of injection wells and an adjacent row of producing wells is the total pore volume of the reservoir underlying the lateral area between the two rows. The quantity of dextran-containing water injected within a row of injection wells toward an adjacent row of producing wells should then be at least 10 percent of the total reservoir volume between the two rows, and preferably at least 20 percent.

The quantity of formaldehyde or other preservative required to stabilize the viscosity of a dextran solution in any given reservoir may be determined experimentally outside the reservoir. For example, knowing the temperature of the reservoir and having samples of the reservoir sand, it is possible to carry out laboratory-scale tests which effectively duplicate reservoir effects and conditions. In general, it has been found that quantities of formaldehyde in the range of about 0.1 to 5 percent by volume of a dextran solution are very effective for the purposes of the invention.

Before injecting a dextran solution of this invention within a reservoir, it is desirable to filter the solution to remove any constituents that might tend to plug the reservoir. Conventional filtering equipment may be used for this purpose.

To further illustrate the invention, attention is directed to the following examples.

EXAMPLE 1

In a first example, 100-milliliter portions of various aqueous dextran solutions were held at 130° F. or 150° F. for periods up to forty-three days. The voscosities of the solutions at 80° F. were periodically determined and noted. The aqueous medium in each instance was a simulated lake water containing 418 parts per million (p.p.m.) sodium, 33 p.p.m. calcium, and 35 p.p.m. magnesium. The compositions of the solutions, and the results obtained from the tests, are presented below.

*Table I*

Viscosity (cp.) After Aging at 150° F.

| Test Solution | Initial | 5 days | 12 days | 19 days | 29 days | 43 days |
| --- | --- | --- | --- | --- | --- | --- |
| 2% Dextran | 26.6 | 4.2 | 3.1 | | | |
| 2% Dextran + 1% Formalin | 28.2 | 15.2 | 13.4 | 12.8 | 11.3 | 9.8 |
| 2% Dextran + 1.5% Formalin | 28.2 | 15.0 | 14.4 | 13.5 | 13.4 | 12.8 |

Viscosity (cp.) After Aging at 130° F.

| | | | | | | |
| --- | --- | --- | --- | --- | --- | --- |
| 2% Dextran + 2% Formalin | 27.8 | 16.5 | 16.3 | 17.8 | 20.3 | 22.2 |
| 2% Dextran + 1% Formalin + 1% NaCl | 28.0 | 19.0 | 17.0 | 17.9 | 18.6 | 20.0 |

The above results clearly indicate that formaldehyde has a pronounced stabilizing effect upon aqueous solutions. They further indicate that the effect is realized even in the presence of various ions.

EXAMPLE 2

In this example, 100-milliliter portions of various aqueous dextran solutions were aged at 70° to 75° F. for periods up to forty-three days. The aqueous medium was a brine containing 58,000 p.p.m. sodium; 9,700 p.p.m. calcium; and 107,300 p.p.m. chlorine. In some instances, 100 grams of a loose reservoir sand were added to the solutions. The results of these tests are shown in the following table.

*Table II*

Viscosity After Aging at 70°-75° F. Centistokes

| Test Solution | Initial | 5 days | 12 days | 19 days | 29 days | 43 days |
|---|---|---|---|---|---|---|
| 1.5% Dextran | 13.3 | 13.6 | 13.2 | 13.2 | ¹ 13.4 | ¹ 12.6 |
| 1.5% Dextran + 100 g. Sand | 13.3 | 11.8 | 12.9 | ² 10.8 | ² 9.9 | ² 10.6 |
| 1.5% Dextran + 100 g. Sand + 0.5 g. Mixture 2/1 Formalin-Acetaldehyde ** | * 13.3 | 11.8 | 11.2 | 13.3 | 12.3 | 13.5 |
| 1.5% Dextran + 100 g. Sand + 1.0 g. Mixture 2/1 Formalin-Acetaldehyde | * 13.3 | 12.4 | 12.6 | ³ 13.8 | ³ 12.8 | 15.1 |
| 1.5% Dextran + 100 g. Sand + 2 ml. Clorox | 5.9 | 5.1 | 5.0 | 5.1 | 5.0 | 6.1 |

| | 1 day | 3 days | 7 days | 14 days | 17 days |
|---|---|---|---|---|---|
| 1.5% Dextran + 1% Formalin | 13.6 | 13.0 | 12.9 | 12.4 | 12.8 | 12.3 |
| 1.5% Dextran + 1.0% Formalin + 100 g. Sand | 13.6 | 12.9 | 13.1 | 12.6 | 13.6 | 13.4 |

* Estimated.
** Acetaldehyde in 50% Solution.
¹ White Precipitate.
² Mold Formation.
³ Cloudy.

The above results show several interesting features. First, they show that aqueous dextran solutions—in the absence of preservatives and in the presence of sand—are subject to degradation as evidenced by the formation of mold. They also show that this type of degradation is successfully avoided by the presence of a preservative such as formaldehyde.

EXAMPLE 3

In a third example, a 2% aqueous dextran solution was passed through a tube packed with an unconsolidated reservoir sand. The aqueous medium was the same as that used for the data in Table I. The tube was one inch in diameter and about two feet long. The test was carried out at room temperature, and sufficient solution was passed through the tube to produce 2.2 pore volumes of effluent. The effluent was periodically examined for its viscosity and its dextran content. The original solution had a viscosity of about 16.3 cp.

In this experiment it was found that the effluent had a dextran concentration substantially identical with that of the original solution. It was further found that the effluent—except for the first 0.2 pore volume—had a viscosity substantially identical with that of the initial solution. This was clear evidence that the viscosity and concentration of aqueous dextran solutions at room temperatures are substantially unaffected by contact with reservoir sand.

While the foregoing description has been devoted to the use of flood waters containing dextran and formaldehyde, it will be recognized that modifications of this concept may be employed without departing from the spirit or scope of the invention. For example, it is contemplated that preservatives other than formaldehyde, such as acetaldehyde and other conventional bactericides and germicides, may be employed. Quaternary ammonium compounds and mercuric chloride, for example, are effective, but not so effective as formaldehyde. It is also contemplated that the preservative material need not always be a germicide or bactericide, although it is preferably so. Again, it should be noted that the expression "dextran solution" is intended to include dextran dispersions, since true solutions of dextran may not always exist.

The invention claimed is:

1. In a method of recovering oil from a subterranean oil reservoir, the step of flooding the reservoir with water containing an amount of dextran in solution sufficient to increase the viscosity of the water, said water further containing a quantity of preservative sufficient to reduce the tendency of the dextran to degrade at the temperature of the reservoir.

2. A method as defined in claim 1 in which the preservative is formaldehyde.

3. A method as defined in claim 2 in which the amount of formaldehyde is between 0.1% and 5% by volume of the water.

4. In a method of recovering oil from a subterranean oil reservoir, the step of flooding the reservoir with water containing within at least a leading portion thereof dextran, said dextran being present in said leading portion in a quantity sufficient to increase substantially the viscosity of the water in which it is contained, said water also containing in at least said leading portion thereof a water-dispersible preservative in a quantity sufficient to reduce the tendency of said dextran to degrade at the temperature of the reservoir.

5. A method as defined in claim 4 in which the water containing said dextran and said preservative constitutes at least 10% of the reservoir pore volume under flood.

6. A method as defined in claim 4 in which the preservative is formaldehyde.

7. A method as defined in claim 6 in which the quantity of formaldehyde is between 0.1% and 5% by volume of said leading portion.

8. In a method of recovering oil from an underground reservoir by flooding the reservoir with water, the improvement which comprises preceding the injection of the flood water with the injection of an aqueous dispersion of dextran, said dispersion containing a quantity of said dextran sufficient to provide the dispersion with a viscosity of at least five centipoises, said aqueous dispersion constituting at least 10 percent of the reservoir pore volume under flood, said dispersion further containing a quantity of a preservative sufficient to reduce the tendency of said dextran to degrade at the temperature of the reservoir.

9. A method as defined in claim 8 in which the preservative comprises formaldehyde.

References Cited in the file of this patent

UNITED STATES PATENTS

| | | |
|---|---|---|
| 2,341,500 | Detling | Feb. 8, 1944 |
| 2,360,327 | Bailey et al. | Oct. 17, 1944 |
| 2,364,434 | Foster | Dec. 5, 1944 |
| 2,602,082 | Owen | July 1, 1952 |
| 2,731,414 | Binder et al. | Jan. 17, 1956 |
| 2,771,138 | Beeson | Nov. 20, 1956 |
| 2,868,725 | Owen | Jan. 13, 1959 |
| 2,908,597 | Owen | Oct. 13, 1959 |

OTHER REFERENCES

Rogers: Composition and Properties of Oil Well Drilling Fluids, Revised Ed., Pub. 1953 by Gulf Publ. Co. of Houston Texas, pages 407, 420, and 421.